(12) United States Patent
Ikeda et al.

(10) Patent No.: US 9,836,668 B2
(45) Date of Patent: Dec. 5, 2017

(54) IMAGE PROCESSING DEVICE, IMAGE PROCESSING METHOD, AND STORAGE MEDIUM

(71) Applicant: SONY CORPORATION, Tokyo (JP)

(72) Inventors: Nobuho Ikeda, Kanagawa (JP);
Kazuhiro Shimauchi, Tokyo (JP);
Seijiro Inaba, Kanagawa (JP)

(73) Assignee: SONY CORPORATION, Tokyo (JP)

(*) Notice: Subject to any disclaimer, the term of this patent is extended or adjusted under 35 U.S.C. 154(b) by 90 days.

(21) Appl. No.: 14/659,855

(22) Filed: Mar. 17, 2015

(65) Prior Publication Data
US 2015/0279073 A1    Oct. 1, 2015

(30) Foreign Application Priority Data
Mar. 26, 2014    (JP) .................... 2014-062992

(51) Int. Cl.
| | |
|---|---|
| G06K 9/62 | (2006.01) |
| G06T 3/40 | (2006.01) |
| G06T 5/00 | (2006.01) |
| G06T 5/50 | (2006.01) |
| G06T 7/00 | (2017.01) |

(52) U.S. Cl.
CPC .......... *G06K 9/6201* (2013.01); *G06T 3/4038* (2013.01); *G06T 5/003* (2013.01); *G06T 5/50* (2013.01); *G06T 7/97* (2017.01); *G06T 2207/10012* (2013.01)

(58) Field of Classification Search
None
See application file for complete search history.

(56) References Cited

U.S. PATENT DOCUMENTS

| | | | | |
|---|---|---|---|---|
| 4,661,986 A | * | 4/1987 | Adelson ............... | G01R 23/167 348/356 |
| 4,674,125 A | * | 6/1987 | Carlson ............... | G01R 23/167 375/E7.04 |

(Continued)

FOREIGN PATENT DOCUMENTS

| | | | | |
|---|---|---|---|---|
| CN | 104933433 A | * | 9/2015 | |
| GB | 2473247 A | * | 3/2011 | ............... G06T 1/00 |

(Continued)

OTHER PUBLICATIONS

CN 104933433 A Machine translation.*

(Continued)

*Primary Examiner* — Michelle M Hausmann
(74) *Attorney, Agent, or Firm* — Chip Law Group

(57) ABSTRACT

There is provided an image processing device including a spatial frequency characteristic adjusting unit configured to perform an adjustment on at least one of first image data corresponding to a first image and second image data corresponding to a second image to match a spatial frequency characteristic of the first image data with a spatial frequency characteristic of the second image data, the second image having an overlapping area that overlaps with an overlapping area of the first image, and an image processing unit configured to perform a process using the first image data and the second image data, on at least one of which the adjustment has been performed in the spatial frequency characteristic adjusting unit.

21 Claims, 11 Drawing Sheets

(56) References Cited

U.S. PATENT DOCUMENTS

| | | | | |
|---|---|---|---|---|
| 5,187,754 A * | 2/1993 | Currin | G06K 9/0063 | 375/E7.086 |
| 5,684,890 A * | 11/1997 | Miyashita | G06T 7/004 | 382/154 |
| 6,005,983 A * | 12/1999 | Anderson | G06T 5/004 | 382/254 |
| 6,184,781 B1 * | 2/2001 | Ramakesavan | B60Q 1/52 | 340/435 |
| 6,192,322 B1 * | 2/2001 | Rafanelli | B64G 3/00 | 342/196 |
| 2002/0154812 A1 * | 10/2002 | Chen | G06T 3/4038 | 382/154 |
| 2007/0081081 A1 * | 4/2007 | Cheng | G06T 3/4038 | 348/218.1 |
| 2008/0126426 A1 * | 5/2008 | Manas | G06Q 10/10 | |
| 2010/0053350 A1 * | 3/2010 | Miyauchi | G02B 27/0075 | 348/222.1 |
| 2012/0242734 A1 * | 9/2012 | Kakutani | B41J 2/07 | 347/15 |
| 2013/0268173 A1 * | 10/2013 | Kambe | G01S 13/346 | 701/96 |
| 2013/0342753 A1 * | 12/2013 | Kitagawa | H04N 5/23229 | 348/349 |
| 2014/0267596 A1 * | 9/2014 | Geerds | H04N 5/2252 | 348/38 |
| 2015/0070523 A1 * | 3/2015 | Chao | H04N 5/23216 | 348/218.1 |
| 2015/0271483 A1 * | 9/2015 | Sun | H04N 17/002 | 348/187 |

FOREIGN PATENT DOCUMENTS

| | | |
|---|---|---|
| JP | 2004-242047 A | 8/2004 |
| WO | 2006/022630 A1 | 3/2006 |

OTHER PUBLICATIONS

Reed, Todd R., and Harry Wechsler. "Segmentation of textured images and Gestalt organization using spatial/spatial-frequency representations." IEEE Transactions on Pattern Analysis and Machine Intelligence 12.1 (1990): 1-12.*

Yi, Meng, Bao-long Guo, and Chun-man Yan. "Aerial video images registration based on optimal derivative filters with scene-adaptive corners." Image and Graphics (ICIG), 2011 Sixth International Conference on. IEEE, 2011.*

Brown, Matthew, and David G. Lowe. "Automatic panoramic image stitching using invariant features." International journal of computer vision 74.1 (2007): 59-73.*

* cited by examiner

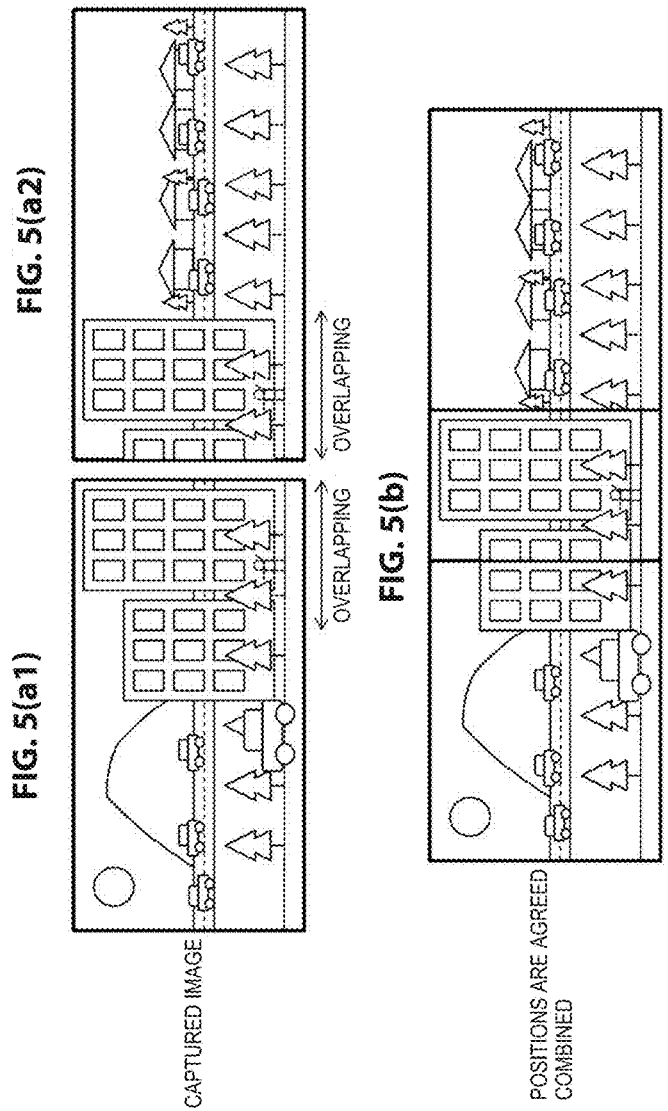

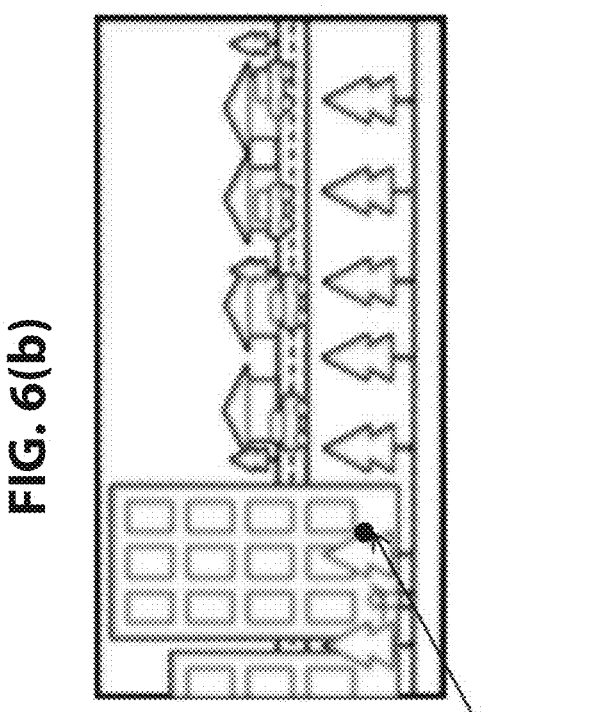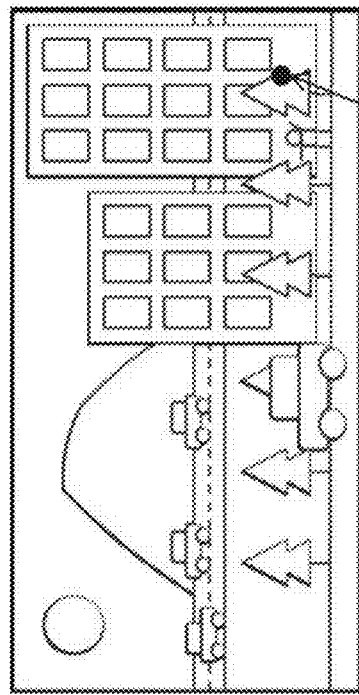

IMAGE PROCESSING DEVICE, IMAGE PROCESSING METHOD, AND STORAGE MEDIUM

CROSS REFERENCE TO RELATED APPLICATIONS

This application claims the benefit of Japanese Priority Patent Application JP 2014-062992 filed Mar. 26, 2014, the entire contents of which are incorporated herein by reference.

BACKGROUND

The present technology relates to an image processing device, an image processing method, and a storage medium. In particular, the present technology relates to an image processing device and the like that process a plurality of images including overlapping areas. Some methods have been devised to correct signal strength such as luminance and chrominance and to adjust the focus lens of a camera, thereby adjusting the amount of blurring in a combined image of images including overlapping areas, the images being captured by one or more cameras (see, for example, JP 2008-507449T (WO 2006/022630A) and JP 2004-242047A).

In addition, algorithm such as scale invariant feature transform (SIFT) has been devised to calculate feature amounts between images and the amount of disagreement between the images. In this algorithm, the respective images are converted into images of different resolution, and feature amounts are calculated and matched between the images of different resolution on the premise that the images to be compared have a comparable level of frequency characteristics.

Accordingly, a variety of resolution of individual cameras is not taken into consideration, so that the amount of disagreement is not correctly calculated. When a panoramic image is made with as few images as possible, the ends of angle of view are used. However, the image resolution at the ends of angle of view is traded off for low prices of cameras in most cases.

SUMMARY

The present technology allows for a favorable process on a plurality of images including overlapping areas.

According to an embodiment of the present disclosure, there is provided an image processing device including a spatial frequency characteristic adjusting unit configured to perform an adjustment on at least one of first image data corresponding to a first image and second image data corresponding to a second image to match a spatial frequency characteristic of the first image data with a spatial frequency characteristic of the second image data, the second image having an overlapping area that overlaps with an overlapping area of the first image, and an image processing unit configured to perform a process using the first image data and the second image data, on at least one of which the adjustment has been performed in the spatial frequency characteristic adjusting unit.

The spatial frequency characteristic adjusting unit may perform an adjustment on at least one of first image data corresponding to a first image and second image data corresponding to a second image to match a spatial frequency characteristic of the first image data with a spatial frequency characteristic of the second image data, the second image having an overlapping area that overlaps with an overlapping area of the first image. For example, the spatial frequency characteristic adjusting unit may filter the first image data and the second image data by using a low-pass filter or a band-pass filter.

In addition, for example, the spatial frequency characteristic adjusting unit may detect the spatial frequency characteristics of the first image data and the second image data, and may match the spatial frequency characteristics of the first image data and the second image data with a spatial frequency characteristic obtained on the basis of a result obtained by detecting the spatial frequency characteristics of the first image data and the second image data. In this case, for example, it is possible to match the spatial frequency characteristics of the first image data and the second image data with a spatial frequency characteristic including the highest spatial frequency that both have in common.

The image processing unit may perform a process using the first image data and the second image data, on at least one of which the adjustment has been performed in the spatial frequency characteristic adjusting unit. For example, the image processing unit may detect a feature amount in each of the overlapping areas of the first image and the second image on the basis of the first image data and the second image data, on which the adjustment has been performed, and may perform a process using the feature amount. In this way, a process is performed using the first image data and the second image data, whose spatial frequency characteristics are matched, and it is possible to favorably perform a process on a plurality of images including overlapping areas.

Additionally, for example, the image processing unit may obtain positional disagreement between the overlapping areas of the first image and the second image on the basis of the first image data and the second image data, on which the adjustment has been performed, and may generate panoramic image data by combining the first image data with the second image data on the basis of information on the positional disagreement.

Additionally, for example, the image processing unit may determine whether or not an identical object is present in the overlapping areas of the first image and the second image, on the basis of the first image data and the second image data, on which the adjustment has been performed.

Additionally, for example, the first image data may be left-eye image data, and the second image data may be right-eye image data. The image processing unit may obtain positional disagreement between the overlapping areas of the first image and the second image, on the basis of the first image data and the second image data, on which the adjustment has been performed, and may perform a disparity adjustment on the first image data and the second image data on the basis of the positional disagreement.

According to one or more embodiments of the present disclosure, it is possible to favorably perform a process on a plurality of images including overlapping areas. Additionally, the advantageous effects described herein are merely examples, and not limited. Any additional advantageous effects may also be attained.

BRIEF DESCRIPTION OF THE DRAWINGS

FIGS. 5(a1), 5(a2), and 5(b) are diagrams each for describing that an amount of positional disagreement between overlapping areas of two captured images is obtained, and positions are agreed to combine images into a panoramic image;

FIGS. 6(a) and 6(b) are diagrams each illustrating examples of two images having a different spatial frequency characteristic (MTF), the two images being captured by a first camera and a second camera that are adjacent to each other;

DETAILED DESCRIPTION OF THE EMBODIMENT(S)

Figure 1:
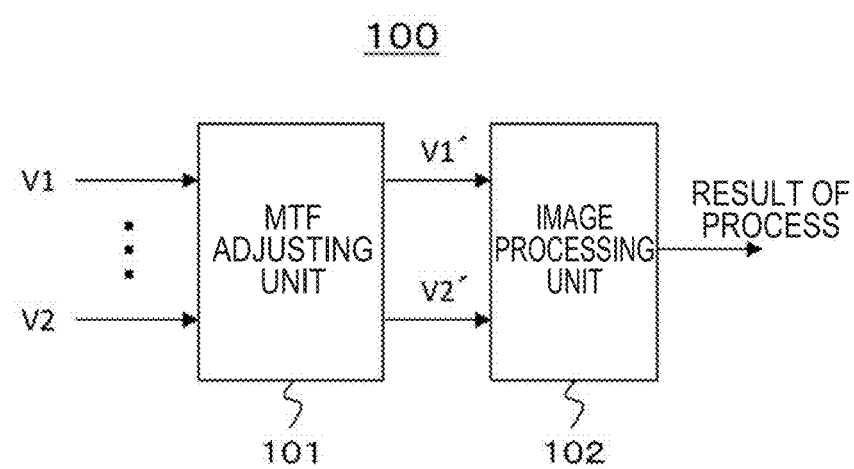
FIG. 1 is a block diagram illustrating a configuration example of an image processing device according to a first embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted. The description will be made in the following order.
1. First Embodiment
2. Second Embodiment
3. Third Embodiment
4. Fourth Embodiment
5. Modified Example

1. First Embodiment

[Configuration Example of Image Processing Device]

FIG. 1 illustrates a configuration example of an image processing device 100 according to a first embodiment. This image processing device 100 includes a spatial frequency characteristic (modulation transfer function (MTF)) adjusting unit 101, and an image processing unit 102.

The MTF adjusting unit 101 performs an adjustment for matching the spatial frequency characteristic of first image data V1 with the spatial frequency characteristic of second image data V2. Here, the first image data V1 is image data corresponding to a first image, and is obtained, for example, by a first camera capturing the first image. The second image data V2 is image data corresponding to a second image that has an overlapping area that overlaps with an overlapping area of the first image, and is obtained, for example, by a second camera capturing the second image. The MTF adjusting unit 101 filters the first image data V1 and the second image data V2 by using a low-pass filter or a band-pass filter to match the spatial frequency characteristic of the first image data V1 with the spatial frequency characteristic of the second image data V2. In this case, a filter characteristic may be fixed, or may also vary adaptively in accordance with the spatial frequency characteristic of each of the first image data V1 and the second image data V2.

When the MTF adjusting unit 101 changes a filter characteristic, the MTF adjusting unit 101 performs, for example, a Fourier transform process to detect the spatial frequency characteristic from the first image data V1 and the spatial frequency characteristic from the second image data V2. The MTF adjusting unit 101 changes a filter characteristic in a manner that the spatial frequency characteristic of each of the first image data V1 and the second image data V2 is limited to a spatial frequency characteristic obtained on the basis of a result obtained by detecting both spatial frequency characteristics, which namely means, for example, the spatial frequency characteristics including the highest spatial frequency that both have in common.

That is to say, the MTF adjusting unit 101 changes a cut-off frequency of the low-pass filter as a filter characteristic to limit the spatial frequency characteristic of each of the first image data V1 and the second image data V2 to a spatial frequency characteristic including the highest spatial frequency that both have in common. Additionally, a cut-off frequency for the first image data V1 is the same as a cut-off frequency for the second image data V2.

In addition, the MTF adjusting unit 101 may match the spatial frequency characteristic of the first image data V1 with the spatial frequency characteristic of the second image data V2, and may also filter the first image data V1 and the second image data V2 by using a low-pass filter having a fixed cut-off frequency.

The image processing unit 102 performs a process using first image data V1' and second image data V2' whose spatial frequency characteristics have been adjusted by the MTF adjusting unit 101, and outputs a result of the process. The image processing unit 102 detects a feature amount in each of overlapping areas of the first image and the second image, for example, on the basis of the first image data V1' and the second image data V2', and performs a process using this detected feature amount. The image processing unit 102 uses algorithm such as SIFT, speed-up robust features (SURF), binary robust invariant scalable keypoints (BRISK), histogram of oriented gradients (HOG), and local binary pattern (LBP) for obtaining a feature amount in an area to detect a feature amount.

For example, the image processing unit 102 performs a process of detecting the amount of positional disagreement between overlapping areas of the first image and the second image by using the detected feature amount. In addition, for example, the image processing unit 102 performs a process of determining whether or not an identical object is present in the overlapping areas of the first image and the second image, by using the detected feature amount.

The image processing unit 102 is not directly supplied with the first image data V1 or the second image data V2, but with the first image data V1' and the second image data V2', whose spatial frequency characteristics have been matched, in the image processing device 100 illustrated in FIG. 1. Accordingly, the image processing unit 102 can favorably perform a process using the first image data and the second image data. For example, the image processing unit 102 shows high performance in detecting the amount of positional disagreement between overlapping areas of the first image and the second image with detection of feature amounts.

2. Second Embodiment

[Configuration Example of Image Processing Device]

Figure 2:
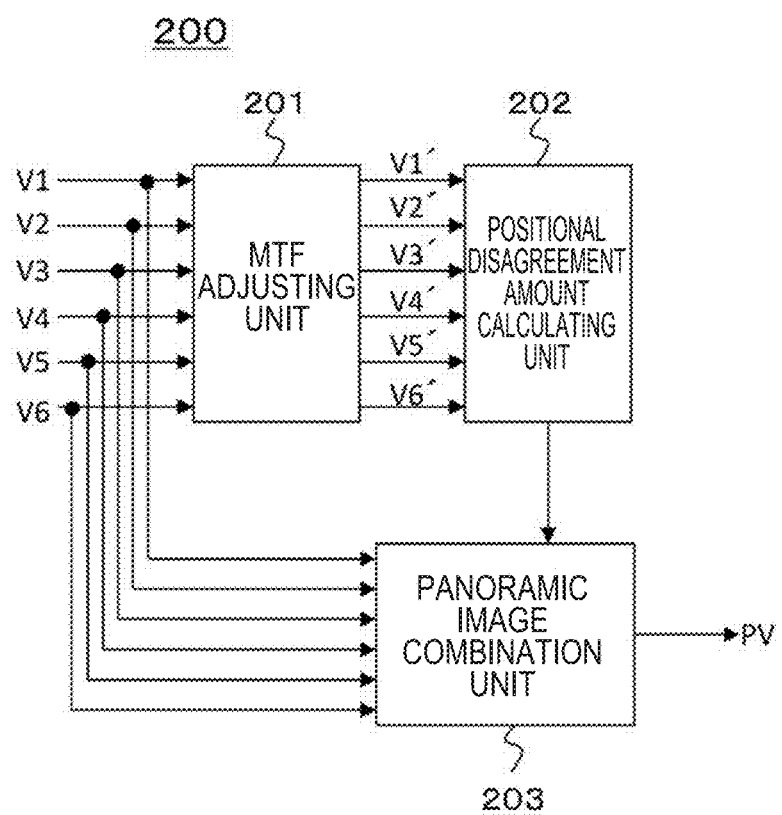
FIG. 2 is a block diagram illustrating a configuration example of an image processing device according to a second embodiment.
Figure 3:
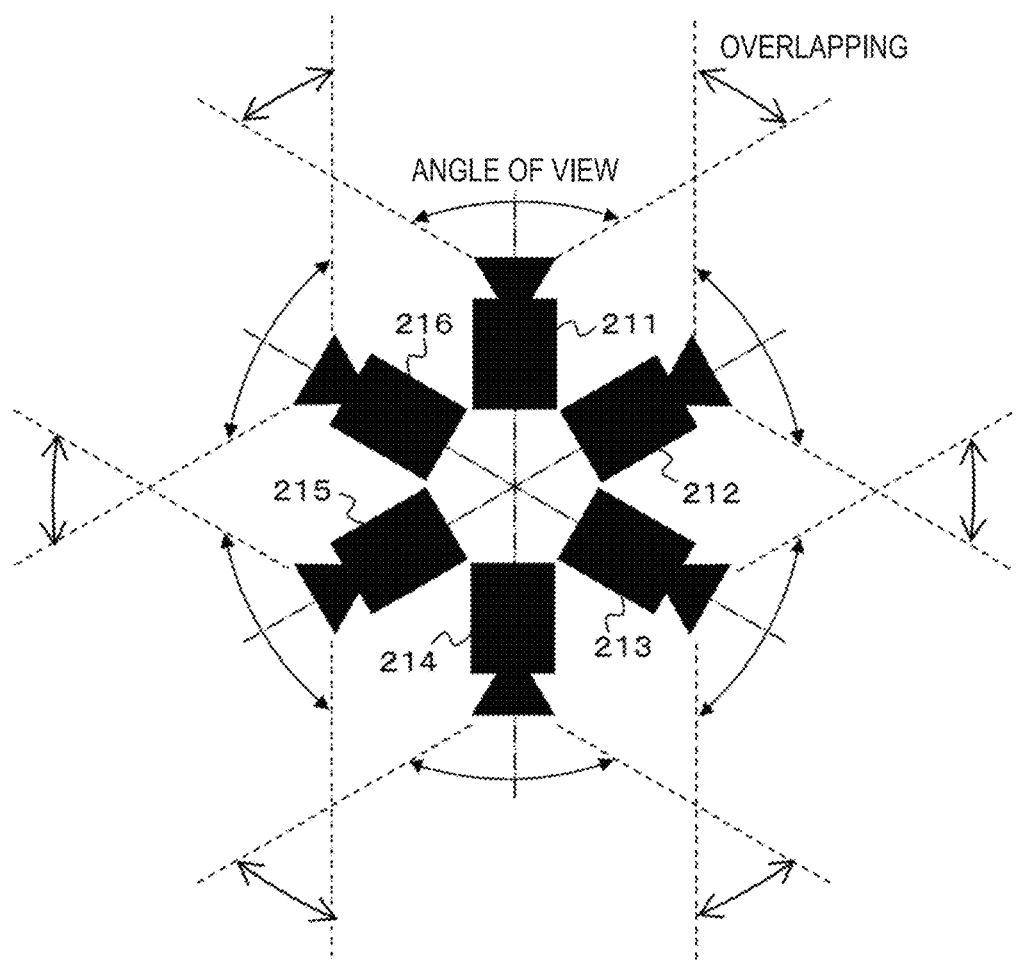
FIG. 3 is a diagram illustrating a relationship between installation, angles of view, and overlapping of six cameras for capturing a panoramic image.

FIG. 2 illustrates a configuration example of an image processing device 200 according to a second embodiment. This image processing device 200 includes a spatial frequency characteristic (MTF) adjusting unit 201, a positional disagreement amount calculating unit 202, and a panoramic image combination unit 203. The MTF adjusting unit 201 performs an adjustment for matching the spatial frequency characteristics of image data V1 to V6. Here, the image data V1 to V6 is image data obtained by six cameras 211 to 216 for capturing a panoramic image, the six cameras 211 to 216 being disposed in a circle to face outward as illustrated in FIG. 3. Here, the image-capturing area of each camera has overlapping areas that overlap with the image-capturing areas of the adjacent cameras, the overlapping areas being made by the angles of view of the cameras. That is to say, images captured by two adjacent cameras have overlapping areas.

Figure 4:
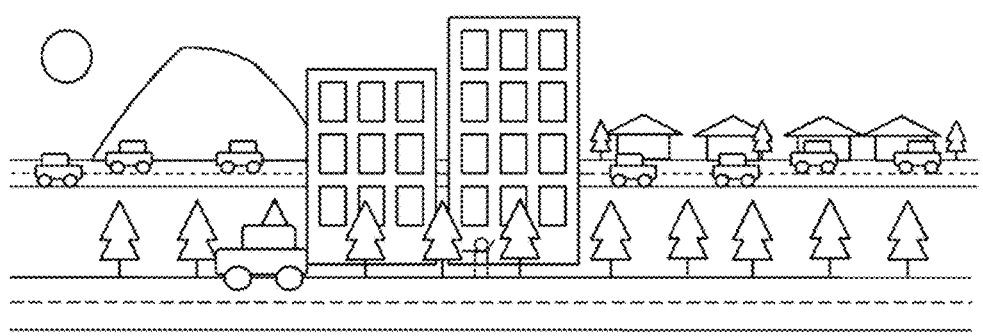
FIG. 4 is a diagram illustrating an example of an object.

FIG. 4 illustrates an example of an object. FIGS. 5(a1) and 5(a2) illustrate examples of images captured by a first camera and a second camera that are adjacent to each other, and each image has an overlapping area. The amount of positional disagreement between the overlapping areas of these images is obtained, and the positions of the overlapping areas are agreed as illustrated in FIG. 5(b), which allows a panoramic image to be generated.

The MTF adjusting unit 201 filters the image data V1 to V6 by using a low-pass filter or a band-pass filter to match the spatial frequency characteristics of the image data V1 to V6. In this case, as for the MTF adjusting unit 101 of the image processing device 100 of FIG. 1, a filter characteristic may be fixed, or may also vary adaptively in accordance with the spatial frequency characteristics of the image data V1 to V6.

The positional disagreement amount calculating unit 202 calculates the amount of positional disagreement between overlapping areas of two adjacent images by using the image data V1' to V6', whose spatial frequency characteristics have been adjusted by the MTF adjusting unit 201. For example, the amount of positional disagreement between overlapping areas of images captured by the cameras 211 and 212, the amount of positional disagreement between overlapping areas of images captured by the cameras 212 and 213, the amount of positional disagreement between overlapping areas of images captured by the cameras 213 and 214, the amount of positional disagreement between overlapping areas of images captured by the cameras 214 and 215, and the amount of positional disagreement between overlapping areas of images captured by the cameras 215 and 216 are each calculated.

In this case, the positional disagreement amount calculating unit 202 detects a feature amount in each of the overlapping areas of the images captured by the camera 211 and 212, for example, on the basis of the image data V1' and V2'. Here, the positional disagreement amount calculating unit 202 uses algorithm such as SIFT, SURF, BRISK, HOG, and LBP for obtaining a feature amount in an area to detect a feature amount. The positional disagreement amount calculating unit 202 then performs a matching process using the detected feature amount, and calculates the amount of positional disagreement between the overlapping areas of the images captured by the cameras 211 and 212. Although the detailed description will be omitted, the positional disagreement amount calculating unit 202 calculates the amounts of positional disagreement between the overlapping areas of the two other adjacent two images in the same way.

The panoramic image combination unit 203 combines the image data V1 to V6 on the basis of the amount of positional disagreement between the overlapping areas of the two adjacent images which has been calculated by the positional disagreement amount calculating unit 202, and obtains panoramic image data PV. In this case, the positions of the overlapping areas of the two adjacent images are agreed and combined on the basis of the amount of positional disagreement (see FIG. 5(b)).

As discussed above, the positional disagreement amount calculating unit 202 is not directly supplied with the image data V1 to V6, but with the image data V1' to V6', whose spatial frequency characteristics have been adjusted, in the image processing device 200 illustrated in FIG. 2. Accordingly, it is possible to enhance the performance of the positional disagreement amount calculating unit 202 for detecting the amount of positional disagreement between overlapping areas of two adjacent images by detecting a feature amount.

FIGS. 6(a) and 6(b) illustrate examples of two images captured by a first camera and a second camera that are adjacent to each other. The two images have a different spatial frequency characteristic (MTF) in this example because of variation in lenses and focus of the first camera and the second camera.

Figure 7A:
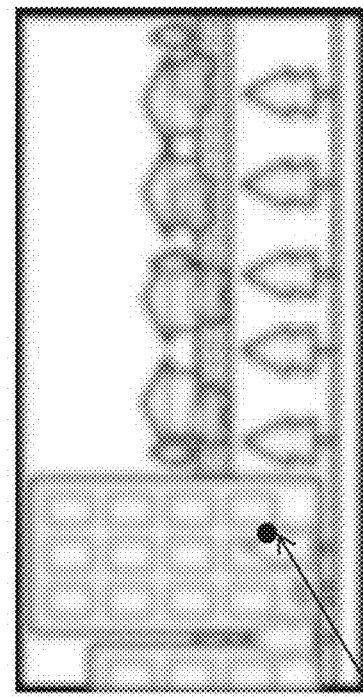
FIGS. 7(a) and 7(b) are diagrams each illustrating examples of two images that have been adjusted to match spatial frequency characteristics (MTFs)
Figure 7B:
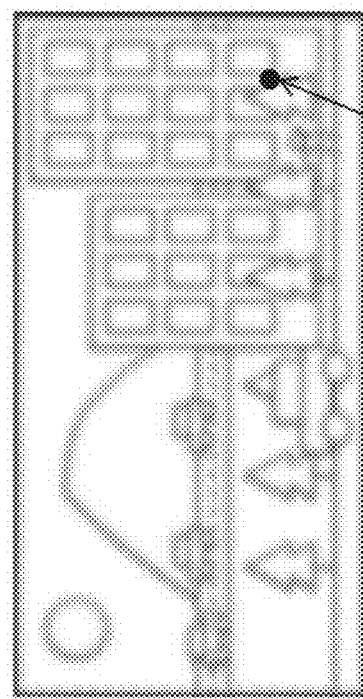

Additionally, variation in lenses and focus means that the first camera has a focus position disagreed to the focus position of the second camera in capturing an image, a manufacturing error leads to different control over focus positions, the lens characteristics are not the same, or the like. This results in a higher probability that no feature amount is detected at the same position P1 because of a difference in the spatial frequency characteristics. To the contrary, FIGS. 7(a) and 7(b) illustrate examples of two images whose spatial frequency characteristics have been matched. This results in a higher probability that a feature amount is detected at the same position P1.

Thus, even if the cameras 211 to 216 have different lenses and focus in the image processing device 200 illustrated in FIG. 2, it is possible to enhance the performance of the positional disagreement amount calculating unit 202 for detecting the amount of positional disagreement. Accordingly, the panoramic image combination unit 203 can favorably combine the image data V1 to V6 to obtain panoramic image data PV of high quality.

3. Third Embodiment

[Configuration Example of Image Processing Device]

Figure 8:
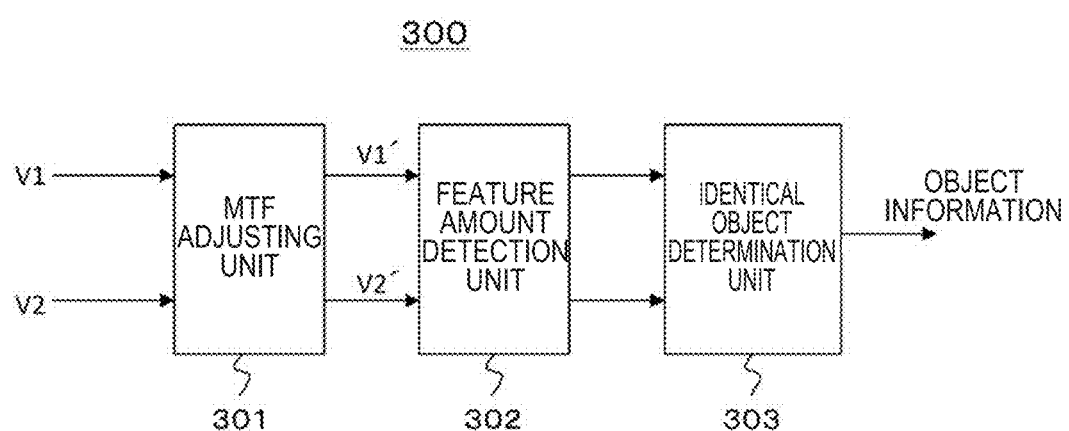
FIG. 8 is a block diagram illustrating a configuration example of an image processing device according to a third embodiment.
Figure 9:
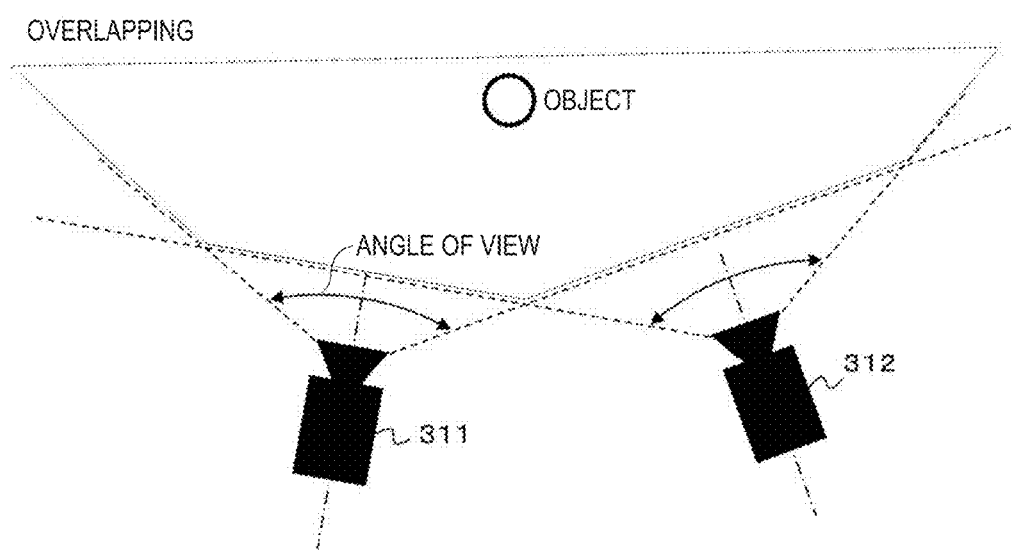
FIG. 9 is a diagram illustrating a relationship between installation, angles of view, and overlapping of two surveillance cameras.

FIG. 8 illustrates a configuration example of an image processing device 300 according to a third embodiment. This image processing device 300 includes a spatial frequency characteristic (MTF) adjusting unit 301, a feature amount detection unit 302, and an identical object determination unit 303. The MTF adjusting unit 301 performs an adjustment for matching the spatial frequency characteristics of image data V1 to V6. Here, the image data V1 and V2 is image data obtained by surveillance cameras 311 and 312 disposed as illustrated in FIG. 9. The image-capturing areas of the surveillance cameras 311 and 312 have polygonal overlapping areas made by the angles of view of the cameras.

The MTF adjusting unit 301 filters the image data V1 and V2 by using a low-pass filter or a band-pass filter to match the spatial frequency characteristics of the image data V1 and V2. In this case, as for the MTF adjusting unit 101 of the image processing device 100 of FIG. 1, a filter characteristic may be fixed, or may also vary adaptively in accordance with the spatial frequency characteristics of the image data V1 to V2.

The feature amount detection unit 302 detects a feature amount in each of the overlapping areas of images captured by the surveillance cameras 311 and 312 on the basis of the image data V1' and VT, whose spatial frequency characteristics have been adjusted by the MTF adjusting unit 301. Here, the feature amount detection unit 302 uses algorithm such as SIFT, SURF, BRISK, HOG, and LBP for obtaining a feature amount in an area to detect a feature amount.

The identical object determination unit 303 determines whether or not the identical object (such as a person and an object) is present in the overlapping areas of the image-capturing areas of the surveillance cameras 311 and 312, by using the feature amount detected by the feature amount detection unit 302, and outputs object information indicating the presence or absence of the object.

As discussed above, the feature amount detection unit 302 is not directly supplied with the image data V1 or V2, but with the image data V1' and VT, whose spatial frequency characteristics have been adjusted, in the image processing device 300 illustrated in FIG. 8. Accordingly, there is a higher probability that the feature amount detection unit 302 detects a feature amount at the same position in each of the images of the surveillance cameras 311 and 312. Thus, the identical object determination unit 303 can accurately determine whether or not the identical object (such as a person and an object) is present in the overlapping areas of the image-capturing areas of the surveillance cameras 311 and 312.

4. Fourth Embodiment

[Configuration Example of Image Processing Device]

Figure 10:
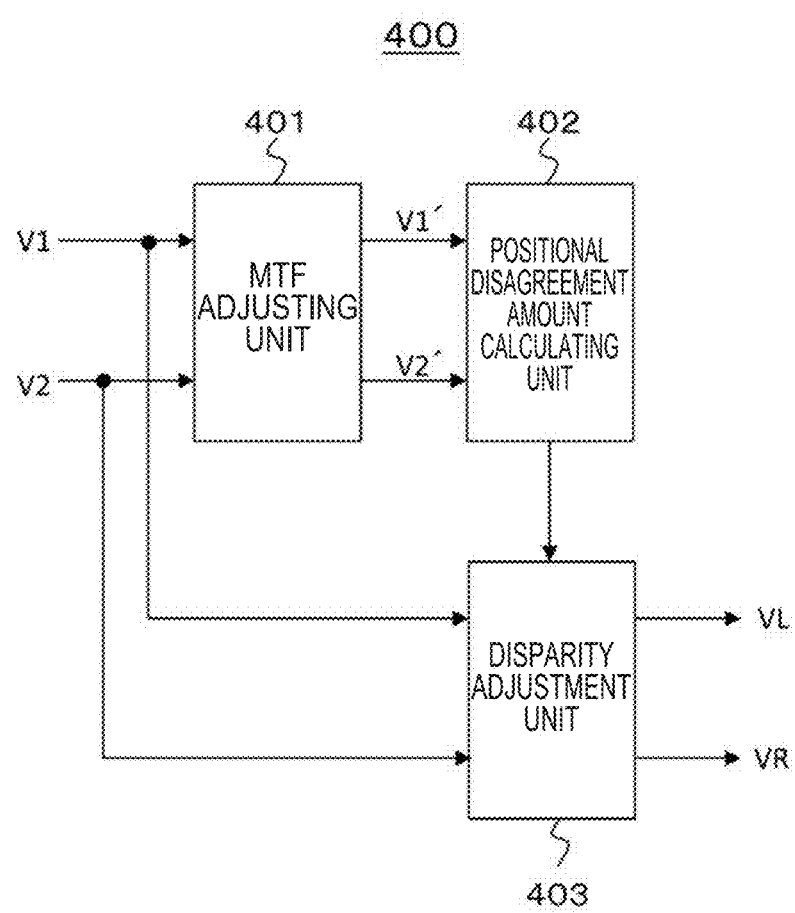
FIG. 10 is a block diagram illustrating a configuration example of an image processing device according to a fourth embodiment.
Figure 11:
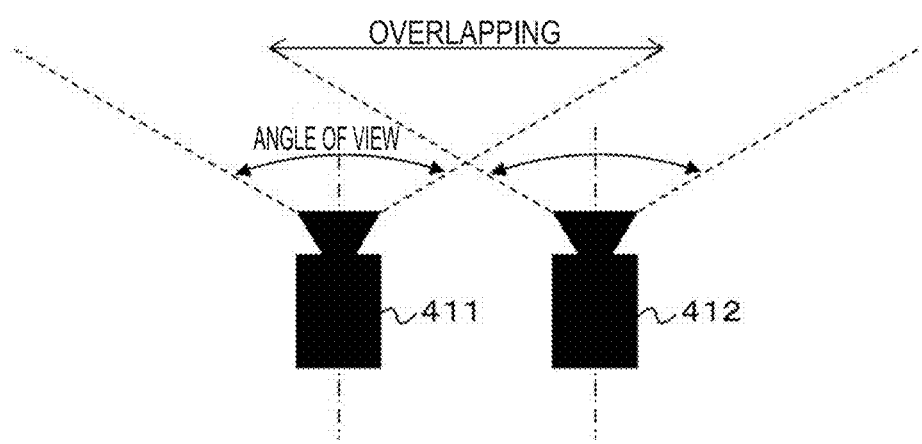
FIG. 11 is a diagram illustrating a relationship between installation, angles of view, and overlapping of a left-eye camera and a right-eye camera.

FIG. 10 illustrates a configuration example of an image processing device 400 according to a fourth embodiment. This image processing device 400 includes a spatial frequency characteristic (MTF) adjusting unit 401, a positional disagreement amount calculating unit 402, and a disparity adjustment unit 403. The MTF adjusting unit 401 performs an adjustment for matching the spatial frequency characteristics of image data V1 and V2. Here, the image data V1 and V2 is image data for a left eye and a right eye, the image data being obtained by a left-eye camera 411 and a right-eye camera 412 that are disposed in parallel as illustrated in FIG. 11. The image-capturing areas of the cameras 411 and 412 have overlapping areas made by the angles of view of the cameras.

The MTF adjusting unit 401 filters the image data V1 and V2 by using a low-pass filter or a band-pass filter to match the spatial frequency characteristics of the image data V1 and V2. In this case, as for the MTF adjusting unit 101 of the image processing device 100 of FIG. 1, a filter characteristic may be fixed, or may also vary adaptively in accordance with the spatial frequency characteristic of the image data V1 and V2.

The positional disagreement amount calculating unit 402 detects a feature amount in each of overlapping areas of a left-eye image and a right-eye image by using the image data V1' and VT, whose spatial frequency characteristics have been adjusted by the MTF adjusting unit 401. Here, the positional disagreement amount calculating unit 402 uses algorithm such as SIFT, SURF, BRISK, HOG, and LBP for obtaining a feature amount in an area to detect a feature amount. The positional disagreement amount calculating unit 402 then performs a matching process using the detected feature amount, and calculates the amount of positional disagreement between the overlapping areas of the left-eye image and the right-eye image.

The disparity adjustment unit 403 performs a disparity adjustment on left-eye image data V1 and right-eye image data V2 on the basis of the amount of positional disagreement between the overlapping areas of the left-eye image and the right-eye image, and obtains left-eye image data VL and right-eye image data VR on which the disparity adjustment has been performed, the amount of positional disagreement having been calculated by the positional disagreement amount calculating unit 402. For example, the disparity adjustment unit 403 adjusts the positions of the left-eye image and the right-eye image in a manner that objects desired to be localized on a screen overlap with each other.

As discussed above, the positional disagreement amount calculating unit 402 is not directly supplied with the image data V1 and V2, but with the image data V1' and V2', whose spatial frequency characteristics have been matched, in the image processing device 400 illustrated in FIG. 10. Accordingly, it is possible to enhance the performance of the positional disagreement amount calculating unit 402 for detecting the amount of positional disagreement between overlapping areas of the left-eye image and the right-eye image.

Thus, even if the left-eye camera 411 and the right-eye camera 412 have different lenses and focus, it is possible to enhance the performance of the positional disagreement amount calculating unit 402 for detecting the amount of positional disagreement. Accordingly, the disparity adjustment unit 403 can accurately perform a disparity adjustment on the image data V1 and V2.

5. Modified Example

Additionally, it was described in the embodiments that the MTF adjusting units 101, 201, 301, and 401 each adjust a spatial frequency characteristic on the time axis, but it is also possible to configure the MTF adjusting units 101, 201, 301, and 401 to adjust a spatial frequency characteristic on the frequency axis.

In this case, the MTF adjusting units 101, 201, 301, and 401 may be configured (1) to detect a spatial frequency characteristic in each image by using Fourier transform, (2) to measure a frequency having power greater than a threshold, (3) to generate data in which discrete cosine transform (DCT) is applied to each image, (4) to regard data that is greater than or equal to the frequency measured in (2) among the data obtained in (3) as zero, and (5) to reconstruct the DCT data obtained in (4) to each image data through inverse DCT.

In addition, it may be understood in the embodiments that the MTF adjusting units 101, 201, 301, and 401 adjust the spatial frequency characteristics of all image data. However, in the case of two image data, it is also possible to configure the MTF adjusting units 101, 201, 301, and 401 to adjust one of the image data in a manner that the spatial frequency characteristic of the one of the image data is the same as the spatial frequency characteristic of the other image data, and not adjust the spatial frequency characteristic of the other image data. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below:

(1) An image processing device including:
a spatial frequency characteristic adjusting unit configured to perform an adjustment on at least one of first image data corresponding to a first image and second image data corresponding to a second image to match a spatial frequency characteristic of the first image data with a spatial frequency characteristic of the second image data, the second image having an overlapping area that overlaps with an overlapping area of the first image; and an image processing unit configured to perform a process using the first image data and the second image data, on at least one of which the adjustment has been performed in the spatial frequency characteristic adjusting unit.

(2) The image processing device according to (1),
wherein the image processing unit detects a feature amount in each of the overlapping areas of the first image and the second image on the basis of the first image data and the second image data, on which the adjustment has been performed, and performs a process using the feature amount.

(3) The image processing device according to (1) or (2),
wherein the spatial frequency characteristic adjusting unit filters the first image data and the second image data by using a low-pass filter or a band-pass filter.

(4) The image processing device according to any one of (1) to (3),
wherein the spatial frequency characteristic adjusting unit detects the spatial frequency characteristics of the first image data and the second image data, and matches the spatial frequency characteristics of the first image data and the second image data with a spatial frequency characteristic obtained on the basis of a result obtained by detecting the spatial frequency characteristics of the first image data and the second image data.

(5) The image processing device according to any one of (1) to (4),
wherein the image processing unit obtains positional disagreement between the overlapping areas of the first image and the second image on the basis of the first image data and the second image data, on which the adjustment has been performed, and generates panoramic image data by combining the first image data with the second image data on the basis of information on the positional disagreement.

(6) The image processing device according to any one of (1) to (4),
wherein the image processing unit determines whether or not an identical object is present in the overlapping areas of the first image and the second image, on the basis of the first image data and the second image data, on which the adjustment has been performed.

(7) The image processing device according to any one of (1) to (4),
wherein the first image data is left-eye image data, and the second image data is right-eye image data, and
wherein the image processing unit obtains positional disagreement between the overlapping areas of the first image and the second image, on the basis of the first image data and the second image data, on which the adjustment has been performed, and performs a disparity adjustment on the first image data and the second image data on the basis of the positional disagreement.

(8) An image processing method including the steps of:
performing an adjustment on at least one of first image data corresponding to a first image and second image data corresponding to a second image to match a spatial frequency characteristic of the first image data with a spatial frequency characteristic of the second image data, the second image having an overlapping area that overlaps with an overlapping area of the first image; and performing a process using the first image data and the second image data, on at least one of which the adjustment has been performed.

(9) The image processing method according to (8),
wherein the process includes detecting a feature amount in each of the overlapping areas of the first image and the second image on the basis of the first image data and the second image data, on which the adjustment has been performed.

(10) The image processing method according to (8) or (9),
wherein the adjustment includes filtering the first image data and the second image data by using a low-pass filter or a band-pass filter.

(11) The image processing method according to any one of (8) to (10),
wherein the adjustment includes detecting the spatial frequency characteristics of the first image data and the second image data, and matching the spatial frequency characteristics of the first image data and the second image data with a spatial frequency characteristic obtained on the basis of a result obtained by detecting the spatial frequency characteristics of the first image data and the second image data.

(12) The image processing method according to any one of (8) to (11),
wherein the process includes obtaining positional disagreement between the overlapping areas of the first image and the second image on the basis of the first image data and the second image data, on which the adjustment has been performed, and generating panoramic image data by combining the first image data with the second image data on the basis of information on the positional disagreement.

(13) The image processing method according to any one of (8) to (12),
wherein the process includes determining whether or not an identical object is present in the overlapping areas of the first image and the second image, on the basis of the first image data and second image data, on which the adjustment has been performed.

(14) The image processing method according to any one of (8) to (13),
wherein the first image data is left-eye image data, and the second image data is right-eye image data, and
wherein the process includes obtaining positional disagreement between the overlapping areas of the first image and the second image, on the basis of the first image data and the second image data, on which the adjustment has been performed, and performing a disparity adjustment on the first image data and the second image data on the basis of the positional disagreement.

(15) A non-transitory computer-readable storage medium storing computer-readable instructions thereon, which, when executed by a computer, cause the computer to perform an image processing method including the steps of:
performing an adjustment on at least one of first image data corresponding to a first image and second image data corresponding to a second image to match a spatial frequency characteristic of the first image data with a spatial frequency characteristic of the second image data, the second image having an overlapping area that overlaps with an overlapping area of the first image; and performing a process using the first image data and the second image data, on at least one of which the adjustment has been performed.

(16) The non-transitory computer-readable storage medium according to the (15), wherein the process includes detecting a feature amount in each of the overlapping areas of the first image and the second image on the basis of the first image data and the second image data, on which the adjustment has been performed.

(17) The non-transitory computer-readable storage medium according to (15) or (16), wherein the adjustment includes filtering the first image data and the second image data by using a low-pass filter or a band-pass filter.

(18) The non-transitory computer-readable storage medium according to any one of (15) to (17), wherein the adjustment includes detecting the spatial frequency characteristics of the first image data and the second image data, and matching the spatial frequency characteristics of the first image data and the second image data with a spatial frequency characteristic obtained on the basis of a result obtained by detecting the spatial frequency characteristics of the first image data and the second image data.

(19) The non-transitory computer-readable storage medium according to any one of (15) to (18), wherein the process includes obtaining positional disagreement between the overlapping areas of the first image and the second image on the basis of the first image data and the second image data, on which the adjustment has been performed, and generating panoramic image data by combining the first image data with the second image data on the basis of information on the positional disagreement.

(20) The non-transitory computer-readable storage medium according to any one of (15) to (19), wherein the process includes determining whether or not an identical object is present in the overlapping areas of the first image and the second image, on the basis of the first image data and the second image data, on which the adjustment has been performed.

(21) The non-transitory computer-readable storage medium according to any one of (15) to (20), wherein the first image data is left-eye image data, and the second image data is right-eye image data, and wherein the process includes obtaining positional disagreement between the overlapping areas of the first image and the second image, on the basis of the first image data and the second image data, on which the adjustment has been performed, and performing a disparity adjustment on the first image data and the second image data on the basis of the positional disagreement.

What is claimed is:

1. An image processing device, comprising:
one or more circuitry configured to:
adjust at least one of a first image data corresponding to a first image or a second image data corresponding to a second image to match a first spatial frequency characteristic of the first image data with a second spatial frequency characteristic of the second image data,
wherein the second image has a second overlapping area that overlaps with a first overlapping area of the first image;
adjust at least one of the first image data or the second image data based on a highest spatial frequency among a plurality of frequencies that the first spatial frequency characteristic and the second spatial frequency characteristic have in common; and
process at least one of the adjusted first image data or the adjusted second image data.

2. The image processing device according to claim 1,
wherein the one or more circuitry are further configured to detect a feature amount, in each of the first overlapping area of the first image and the second overlapping area of the second image, based on the adjusted first image data and the adjusted second image data, and process the first overlapping area and the second overlapping area based on the feature amount.

3. The image processing device according to claim 1,
wherein the one or more circuitry are further configured to filter the first image data and the second image data based on one of a low-pass filter or a band-pass filter.

4. The image processing device according to claim 1,
wherein the one or more circuitry are further configured to:
detect the first spatial frequency characteristic of the first image data and the second spatial frequency characteristic of the second image data; and
match the first spatial frequency characteristic of the first image data and the second spatial frequency characteristic of the second image data with a third spatial frequency characteristic obtained based on the detection of the first spatial frequency characteristic of the first image data and the second spatial frequency characteristic of the second image data.

5. The image processing device according to claim 1,
wherein the one or more circuitry are further configured to:
determine a positional disagreement between the first overlapping area of the first image and the second overlapping area of the second image based on the adjusted first image data and the adjusted second image data; and
combine the first image data with the second image data based on the positional disagreement to generate panoramic image data.

6. The image processing device according to claim 1,
wherein the one or more circuitry are further configured to determine, that an identical object is present in the first overlapping area of the first image and the second overlapping area of the second image, based on the adjusted first image data and the adjusted second image data.

7. The image processing device according to claim 1,
wherein the first image data is left-eye image data and the second image data is right-eye image data, and
wherein the one or more circuitry are further configured to:
obtain a positional disagreement between the first overlapping area of the first image and the second overlapping area of the second image, based on the adjusted first image data and the adjusted second image data; and
disparity adjust the first image data and the second image data based on the positional disagreement.

8. An image processing method, comprising:
adjusting at least one of a first image data corresponding to a first image or a second image data corresponding to a second image to match a first spatial frequency characteristic of the first image data with a second spatial frequency characteristic of the second image data, wherein the second image has a second overlapping area that overlaps with a first overlapping area of the first image, and wherein at least one of the first image data or the second image data is adjusted based on a highest spatial frequency among a plurality of frequencies that the first spatial frequency characteristic and the second spatial frequency characteristic have in common; and processing at least one of the adjusted first image data or the adjusted second image data.

9. The image processing method according to claim 8, wherein the processing of the at least one of the adjusted first image data or the adjusted second image data includes detecting a feature amount, in each of the first overlapping area of the first image and the second overlapping area of the second image, based on the adjusted first image data and the adjusted second image data.

10. The image processing method according to claim 8, wherein the adjustment includes filtering the first image data and the second image data based on one of a low-pass filter or a band-pass filter.

11. The image processing method according to claim 8, wherein the adjustment includes detecting the first spatial frequency characteristic of the first image data and the second spatial frequency characteristic of the second image data, and matching the first spatial frequency characteristic of the first image data and the second spatial frequency characteristic of the second image data with a third spatial frequency characteristic obtained based on a result obtained by detecting the first spatial frequency characteristic of the first image data and the second spatial frequency characteristic of the second image data.

12. The image processing method according to claim 8, wherein the processing of the at least one of the adjusted first image data or the adjusted second image data includes:

obtaining a positional disagreement between the first overlapping area of the first image and the second overlapping area of the second image based on the adjusted first image data and the adjusted second image data; and combining the first image data with the second image data based on the positional disagreement to generate panoramic image data.

13. The image processing method according to claim 8, wherein the processing of the at least one of the adjusted first image data or the adjusted second image data includes determining that an identical object is present in the first overlapping area of the first image and the second overlapping area of the second image, based on the adjusted first image data and adjusted second image data.

14. The image processing method according to claim 8, wherein the first image data is left-eye image data, and the second image data is right-eye image data, and wherein the processing of the at least one of the adjusted first image data or the adjusted second image data includes:

obtaining a positional disagreement between the first overlapping area of the first image and the second overlapping area of the second image, based on the adjusted first image data and the adjusted second image data; and disparity adjusting the first image data and the second image data based on the positional disagreement.

15. A non-transitory computer-readable medium storing computer-readable instructions thereon, which, when executed by a computer, cause the computer to execute operations, the operations comprising:

adjusting at least one of a first image data corresponding to a first image or a second image data corresponding to a second image to match a first spatial frequency characteristic of the first image data with a second spatial frequency characteristic of the second image data, wherein the second image has a second overlapping area that overlaps with a first overlapping area of the first image, and wherein at least one of the first image data or the second image data is adjusted based on a highest spatial frequency among a plurality of frequencies that the first spatial frequency characteristic and the second spatial frequency characteristic have in common; and processing at least one of the adjusted first image data or the adjusted second image data.

16. The non-transitory computer-readable medium according to the claim 15, wherein the processing of the at least one of the adjusted first image data or the adjusted second image data includes detecting a feature amount, in each of the first overlapping area of the first image and the second overlapping area of the second image, based on the adjusted first image data and the adjusted second image data.

17. The non-transitory computer-readable medium according to claim 15, wherein the adjustment includes filtering of the first image data and the second image data based on one of a low-pass filter or a band-pass filter.

18. The non-transitory computer-readable medium according to claim 15, wherein the adjustment includes detecting the first spatial frequency characteristic of the first image data and the second spatial frequency characteristic of the second image data, and matching the first spatial frequency characteristic of the first image data and the second spatial frequency characteristic of the second image data with a third spatial frequency characteristic obtained based on a result obtained by detecting the first spatial frequency characteristic of the first image data and the second spatial frequency characteristic of the second image data.

19. The non-transitory computer-readable medium according to claim 15, wherein the processing of the at least one of the adjusted first image data or the adjusted second image data includes:

obtaining a positional disagreement between the first overlapping area of the first image and the second overlapping area of the second image based on the adjusted first image data and the adjusted second image data; and combining the first image data with the second image data based on the positional disagreement to generate panoramic image data.

20. The non-transitory computer-readable medium according to claim 15, wherein the processing of the at least one of the adjusted first image data or the adjusted second image data includes determining that an identical object is present in the first overlapping area of the first image and the second overlapping area of the second image, based on the adjusted first image data and the adjusted second image data.

21. The non-transitory computer-readable medium according to claim 15, wherein the first image data is left-eye image data, and the second image data is right-eye image data, and wherein the processing of the at least one of the adjusted first image data or the adjusted second image data includes:

obtaining a positional disagreement between the first overlapping area of the first image and the second overlapping area of the second image, based on the adjusted first image data and the adjusted second image data; and disparity adjusting the first image data and the second image data based on the positional disagreement.

* * * * *